(12) United States Patent
Amari et al.

(10) Patent No.: US 8,395,292 B2
(45) Date of Patent: Mar. 12, 2013

(54) AXIAL GAP MOTOR AND METHOD OF MANUFACTURING ROTOR FOR SAME

(75) Inventors: Yusaku Amari, Saitama (JP); Shigeru Tajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/145,904

(22) PCT Filed: Dec. 28, 2009

(86) PCT No.: PCT/JP2009/071807
§ 371 (c)(1),
(2), (4) Date: Jul. 22, 2011

(87) PCT Pub. No.: WO2010/087103
PCT Pub. Date: Aug. 5, 2010

(65) Prior Publication Data
US 2011/0285237 A1    Nov. 24, 2011

(30) Foreign Application Priority Data
Jan. 30, 2009  (JP) ............................. P.2009-020556

(51) Int. Cl.
*H02K 21/24* (2006.01)
*H02K 1/30* (2006.01)
(52) U.S. Cl. ............... 310/156.12; 310/156.07; 310/267
(58) Field of Classification Search .................... 310/44, 310/156.08, 156.32–156.38, 156.43, 156.48, 310/156.55, 156.59, 156.62–156.65, 216.003, 310/216.007–216.008, 266–268
See application file for complete search history.

(56) References Cited

U.S. PATENT DOCUMENTS

| | | | | |
|---|---|---|---|---|
| 4,641,422 A * | 2/1987 | Weaver | ........................... | 29/598 |
| 5,581,140 A * | 12/1996 | Futami et al. | ............ | 310/156.53 |
| 6,392,324 B1 * | 5/2002 | Kuwahara | ................ | 310/156.11 |
| 7,679,260 B2 * | 3/2010 | Yamamoto et al. | ............ | 310/268 |
| 7,906,883 B2 * | 3/2011 | Abe | ......................... | 310/156.64 |
| 8,040,008 B2 * | 10/2011 | Kawamura et al. | ...... | 310/156.32 |
| 8,049,389 B2 * | 11/2011 | Abe et al. | ................. | 310/156.62 |
| 8,053,942 B2 * | 11/2011 | Abe et al. | ................. | 310/156.64 |
| 2010/0320858 A1 * | 12/2010 | Ishikawa et al. | ......... | 310/156.07 |
| 2011/0273034 A1 * | 11/2011 | Yamamoto | ..................... | 310/44 |

FOREIGN PATENT DOCUMENTS

| | | | | |
|---|---|---|---|---|
| JP | 2001-136721 A | | 5/2001 | |
| JP | 2003-510993 A | | 3/2003 | |
| JP | 2006-166635 A | | 6/2006 | |
| JP | 2008-172884 A | | 7/2008 | |
| JP | 2008-278648 A | | 11/2008 | |
| JP | 2008271640 A | * | 11/2008 | .................... 310/268 |
| JP | 2009-11023 A | | 1/2009 | |

* cited by examiner

*Primary Examiner* — Tran Nguyen
(74) *Attorney, Agent, or Firm* — Arent Fox LLP

(57) ABSTRACT

There are provided an axial gap motor including a rotor having plural main magnet portions magnetized in the rotational axis direction and disposed at predetermined intervals in a circumferential direction, also plural yoke portions formed by a lamination member of tape-like wound electromagnetic steel sheet and are disposed on either axial side of the main magnet portions, also a rotor frame having plural ribs disposed individually between the main magnet portions adjacent to each other in the circumferential direction and extend in a radial direction, and inner and outer cylindrical portions are provided at respectively inside and outside diameter sides of the ribs and made of a die casting alloy; also the main magnet portions each have a groove at an inner circumferential side thereof for preventing the displacement of the position of the main magnet portions.

14 Claims, 15 Drawing Sheets

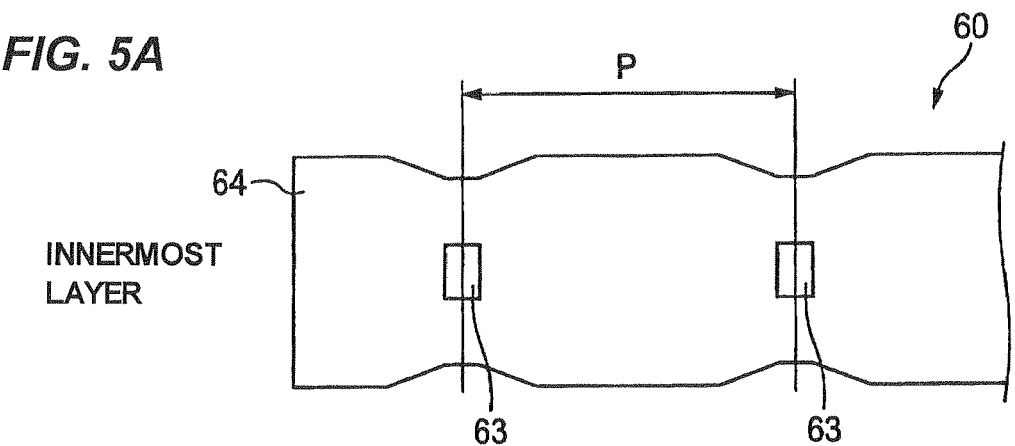
FIG. 5A INNERMOST LAYER
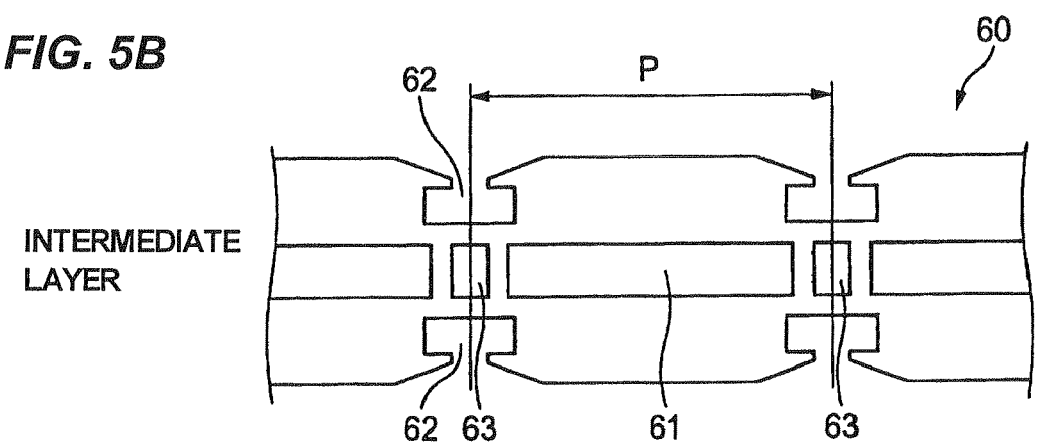
FIG. 5B INTERMEDIATE LAYER
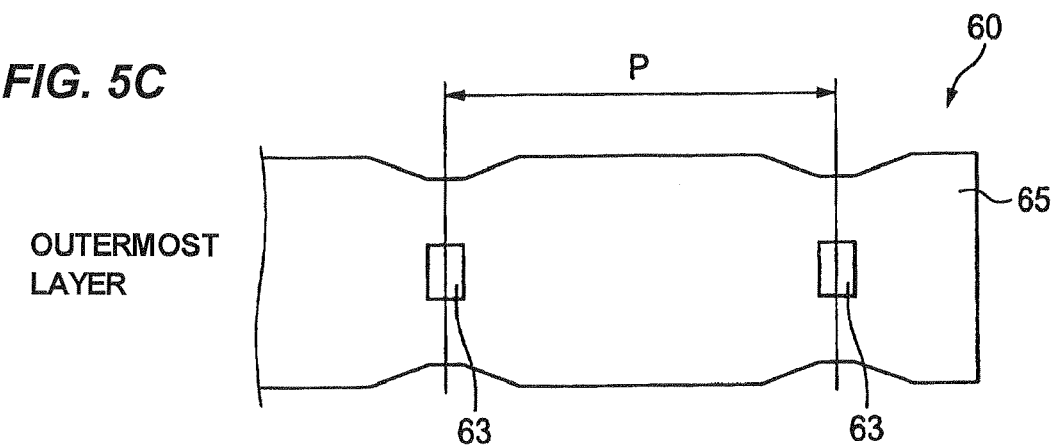
FIG. 5C OUTERMOST LAYER

INNERMOST LAYER

INTERMEDIATE LAYER (SECOND LAYER TO Nth LAYER)

INTERMEDIATE LAYER (FROM N+1th LAYER)

OUTERMOST LAYER

AXIAL GAP MOTOR AND METHOD OF MANUFACTURING ROTOR FOR SAME

TECHNICAL FIELD

The present invention relates to an axial gap motor.

BACKGROUND ART

Conventionally, there have been known axial gap motors, for example, which include a rotor rotatable about a rotational axis and a stator which is disposed so as to face the rotor from at least one side thereof with respect to the direction of the rotational axis and in which a loop of flux via the stator is formed for a field flux by a permanent magnet of the rotor (refer to Patent Document, for example).

For example, in an axial gap motor described in Patent Document 1, as is shown in FIG. 17, a rotor 100 includes a rotor frame 101 of a non-magnetic material, a plurality of fan-shaped permanent magnets 102 and a plurality of fan-shaped iron cores 103. The permanent magnets 102 are fitted in opening portions 101a in the rotor frame 101 so as to be fixed in place therein, and the iron cores 103 are fitted in opening portions 101b in the rotor frame 101 so as to be fixed in place therein. In addition, S poles and N poles are arranged alternately on magnetic pole surfaces of the permanent magnets 102. The axial gap motor attempts to realize a highly efficient generation of rotational torque.

RELATED ART DOCUMENT

Patent Document

Patent Document 1: JP-A-2001-136721 (FIG. 5)

SUMMARY OF THE INVENTION

Problems that the Invention is to Solve

Incidentally, in an axial gap motor, when a gap is produced between permanent magnets and a rotor frame, the permanent magnets are displaced or loosened by centrifugal force or attraction force when a rotor rotates. Because of this, conventionally, the permanent magnets are fixed to the rotor frame with an adhesive. On the other hand, in the axial gap motor described in Patent Document 1, the permanent magnets 102 and the iron cores 103 are fixed in place only by being fitted in the rotor frame 101, there has been a possibility that the permanent magnets 102 and the iron cores 103 are displaced or loosened when the motor rotates at high speeds.

The invention has been made in view of these situations, and an object thereof is to provide an axial gap motor which can reduce the number of manufacturing steps due to permanent magnets not having to be fixed by an adhesive and which can prevent permanent magnets from being displaced or loosened so that the permanent magnets can be positioned within a rotor frame in an ensured fashion and a manufacturing method for manufacturing a rotor for the motor.

Means for Solving the Problem

With a view to attaining the object, there is provided an axial gap motor (for example, an axial gap motor 10 in an embodiment which will be described later) comprising:
a rotor (for example, a rotor 11 in the embodiment described later) adapted to rotate about a rotational axis; and
a stator (for example, a stator 12 in the embodiment described later, for example) disposed to face the rotor from at least one side thereof with respect to the direction of a rotational axis, wherein:
the rotor comprises:
a plurality of main magnet portions (for example, main magnet portions 41 in the embodiment described later) which are magnetized in the direction of the rotational axis and which are disposed at predetermined intervals in a circumferential direction;
a plurality of yoke portions (for example, yoke portions 42 in the embodiment described later) which are disposed on at least one side of the plurality of main magnet portions with respect to the direction of the rotational axis; and
a rotor frame (for example, a rotor frame 30 in the embodiment described later) having a plurality of ribs (for example, ribs 31 in the embodiment described later) which are disposed individually between the main magnet portions which lie adjacent to each other in the circumferential direction and which extend in a radial direction, and an inner cylindrical portion (for example, an inner cylindrical portion 32 in the embodiment described later) and an outer cylindrical portion (for example, an outer cylindrical portion 33 in the embodiment described later) which are provided at inside diameter sides and outside diameter sides, respectively, of the plurality of ribs, with at least the inner cylindrical portion made of a die casting alloy; and
the main magnet portions each have a displacement preventing portion at an inner circumferential side thereof for preventing the displacement of the position of the main magnet portion.

There is also provided the above axial gap motor wherein a casting alloy entry preventing plate (for example, a casting alloy entry preventing plate 79 in the embodiment described later) is disposed between the inner cylindrical portion of the rotor frame and the main magnet portions.

There is also provided the above axial gap motor wherein the displacement preventing portion is a groove in an intermediate portion with respect to the direction of the rotational axis of an inner circumferential surface of the main magnet portion which extends in a circumferential direction.

There is also provided the above axial gap motor wherein a circumferential length of the groove is shorter than a circumferential length of the inner circumferential surface of the main magnet portion.

There is also provided the above axial gap motor wherein the displacement preventing portion of the main magnet portion is made up of chamfered portions (for example, chamfered portions 41c in the embodiment described later) which are formed by thread chamfering corners of the main magnet portion between the inner circumferential surface and both circumferential lateral surfaces thereof.

There is also provided the above axial gap motor wherein:
the rotor further comprises a plurality of auxiliary magnet portions (for example, auxiliary magnet portions 43 in the embodiment described later) which lie individually between the yoke portions which lie adjacent to each other in the circumferential direction and which are magnetized in the direction of the rotational axis and a direction which is at right angles to a radial direction; and
the auxiliary magnet portions each have a different displacement preventing portion (a groove 43a in the embodiment described later) provided at an inner circumferential side thereof for preventing the displacement of the position of the auxiliary magnet portion.

There is also provided the above axial gap motor wherein
the different displacement preventing portion of the auxiliary magnet portion is a groove in an intermediate portion with respect to the direction of the rotational axis of an inner circumferential surface of the auxiliary magnet portion which extends along a circumferential direction.

There is also provided the above axial gap motor wherein
the different displacement preventing portion of the auxiliary magnet portion is made up of chamfered portions (for example, chamfered portions 43c in the embodiment described later) which are formed by thread chamfering corners of the auxiliary magnet portion between the inner circumferential surface and both circumferential lateral surfaces thereof.

There is also provided the above axial gap motor wherein:
the rotor further comprises an outer ring (for example, an outer ring 50 in the embodiment described later) having different rotor frame mounting hole portions (for example, different rotor frame mounting hole portions 51 in the embodiment described later) which are formed in an inner circumferential surface thereof; and
the rotor frame has outwardly projecting portions (for example, outwardly projecting portions 35 in the embodiment described later) which are formed through casting thereon so as to enter the different rotor frame mounting hole portions in the outer ring.

There is provided a manufacturing method for manufacturing a rotor of an axial gap motor comprising a rotor rotatably about a rotational axis, and a stator disposed to face the rotor from at least one side thereof with respect to the direction of a rotational axis, the rotor comprising a plurality of main magnet portions which are magnetized in the direction of the rotational axis and which are disposed at predetermined intervals in a circumferential direction, a plurality of yoke portions which are disposed on at least one side of the plurality of main magnet portions with respect to the rotational axis, and a rotor frame having a plurality of ribs which are disposed individually between the main magnet portions which lie adjacent to each other in the circumferential direction and which extend in a radial direction, and an inner cylindrical portion and an outer cylindrical portion which are provided at inside diameter sides and outside diameter sides, respectively, of the plurality of ribs, the method including the steps of:

at least positioning the plurality of main magnet portions having the displacement preventing portions at the inner circumferential sides thereof for preventing the displacement of the positions of the main magnet portions and the plurality of yoke portions in molds (for example, a first and second molds 80, 81 in the embodiment described later); and at least pouring a die casting alloy into the molds to cast it into the inner cylindrical portion of the rotor frame while causing the die casting alloy to enter the displacement preventing portions.

There is also provided the above manufacturing method for manufacturing a rotor of an axial gap motor wherein:
a casting alloy entry preventing plate is disposed between the inner cylindrical portion of the rotor frame and the main magnet portions; and
in the casting step, the casting alloy entry preventing plate is deformed according to the shape of the displacement preventing portions.

There is also provided the above manufacturing method for manufacturing a rotor of an axial gap motor wherein
a casting alloy entry preventing plate having preliminary deformed portions adapted to be accommodated in advance in the displacement preventing portions of the main magnet portions is disposed between the inner cylindrical portion of the rotor frame and the main magnet portions.

There is also provided the above manufacturing method for manufacturing a rotor of an axial gap motor further including the step of:
forming a lamination member making up the plurality of yoke portions and the casting alloy entry preventing plate which is disposed between the inner cylindrical portion of the rotor frame and the main magnet portions by winding a tape-like sheet of electromagnetic steel.

There is also provided the above manufacturing method for manufacturing a rotor of an axial gap motor wherein:
the rotor comprises further a plurality of auxiliary magnet portions which lie individually between the yoke portions which lie adjacent to each other in the circumferential direction and which are magnetized in the direction of the rotational axis and a direction which is at right angles to a radial direction;
in the positioning step, the plurality of auxiliary magnet portions each having a different displacement preventing portion at an inner circumferential side thereof for preventing the displacement of the position of the auxiliary magnet portion are positioned in the molds; and
in the casting step, the die casting alloy also enters further the different displacement preventing portions.

There is also provided the above manufacturing method for manufacturing a rotor of an axial gap motor wherein
a casting alloy entry preventing plate having different preliminary deformed portions adapted to be accommodated in advance in the different displacement preventing portions of the auxiliary magnet portions is disposed between the inner cylindrical portion of the rotor frame and the auxiliary magnet portions.

Advantage of the Invention

When manufacturing the inner cylindrical portion of the rotor frame by pouring the die casting alloy into the molds, by the entry of the die casting alloy into the displacement preventing portions of the main magnet portions, the displacement or loosening of the main magnet portions can be prevented without fixing the main magnet portions with an adhesive. By this configuration, the generation of abnormal noise can be suppressed which would otherwise occur by vibrations generated in the main magnet portions by centrifugal force or inertial force produced when the rotor rotates at high speeds.

The contact of the die casting alloy with lateral surfaces of the main magnet portions is prevented by the casting alloy entry preventing plate, thereby making it possible to prevent the disruption of the flow of magnetic flux by the die casting alloy.

The displacement or loosening of the main magnet portions at least in the direction of the rotational axis is prevented by the grooves, thereby making it possible to suppress the generation of vibrations. In addition, in the case of there being provided the casting alloy entry preventing plate, the same plate can easily be press attached to the main magnet portions when pouring the die casting alloy.

The displacement or loosening of the main magnet portions is prevented not only in the direction of the rotational axis but also in the circumferential direction, and even when the rotating condition of the rotor is changed (suddenly stopped, suddenly accelerated or rotated reversely), the generation of vibrations can be suppressed.

Since the die casting alloy holds the main magnet portions from both circumferential sides thereof by the chamfered portions, a circumferential displacement or loosening of the main magnet portions is also prevented, whereby even when the rotating condition of the rotor is changed (suddenly stopped, suddenly accelerated or rotated reversely), the generation of vibrations can be suppressed.

By adopting the substantially Halbach construction, the effective flux generation amount can be increased relatively by the flux lens effect which restricts the direction of fluxes of the main magnet portions. In addition, by the entry of the die casting die into the different displacement preventing portions of the auxiliary magnet portions, the displacement or loosening of the auxiliary magnet portions can be prevented.

The displacement or loosening of the auxiliary magnet portions at least in the direction of the rotational axis is prevented by the grooves, thereby making it possible to suppress the generation of vibrations. In addition, in the case of there being provided the casting alloy entry preventing plate, the same plate can easily be press attached to the auxiliary magnet portions when pouring the die casting alloy.

Since the die casting alloy holds the auxiliary magnet portions from both circumferential sides thereof by the chamfered portions, a circumferential displacement or loosening of the auxiliary magnet portions is also prevented, whereby even when the rotating condition of the rotor is changed (suddenly stopped, suddenly accelerated or rotated reversely), the generation of vibrations can be suppressed.

Since the outer ring is integrated with the rotor frame when the rotor frame is formed through casting, the press fitting work of the outer ring onto the rotor frame is made unnecessary. In addition, the displacement or loosening of the yoke portions and the main magnet portions is prevented by the outer ring which would otherwise occur when the rotor rotates at high speeds.

The contact of the die casting alloy with lateral surfaces of the main magnet portions is prevented by the casting alloy entry preventing plate, thereby making it possible to prevent the disruption of the flow of magnetic flux by the die casting alloy. Further, since the casting alloy entry preventing plate is deformed by the pressure generated when the die casting alloy is poured into the molds, thereby making it possible to prevent the displacement or loosening of the main magnet portions.

The displacement or loosening of the main magnet portions can be prevented by the preliminary deformed portions. Further, in the case of there being provided the casting alloy entry preventing plate, the same plate can be press attached to the main magnet portions in a more ensured fashion when the die casting alloy is poured into the molds.

The yoke portions and the casting alloy entry preventing plate can easily be made, and the yoke portions and the rotor frame can easily be integrated with each other.

The displacement or loosening of the auxiliary magnet portions can be prevented by the different preliminary deformed portions. Further, in the case of there being provided the casting alloy entry preventing plate, the same plate can be press attached to the auxiliary magnet portions in a more ensured fashion when the die casting alloy is poured into the molds.

BRIEF DESCRIPTION OF THE DRAWINGS

FIG. 5A is a plan view showing an innermost layer of a tape-like sheet of electromagnetic steel, FIG. 5B is a plan view showing an intermediate layer thereof, and FIG. 5C is a plan view showing an outermost layer thereof;

MODE FOR CARRYING OUT THE INVENTION

Figure 1:
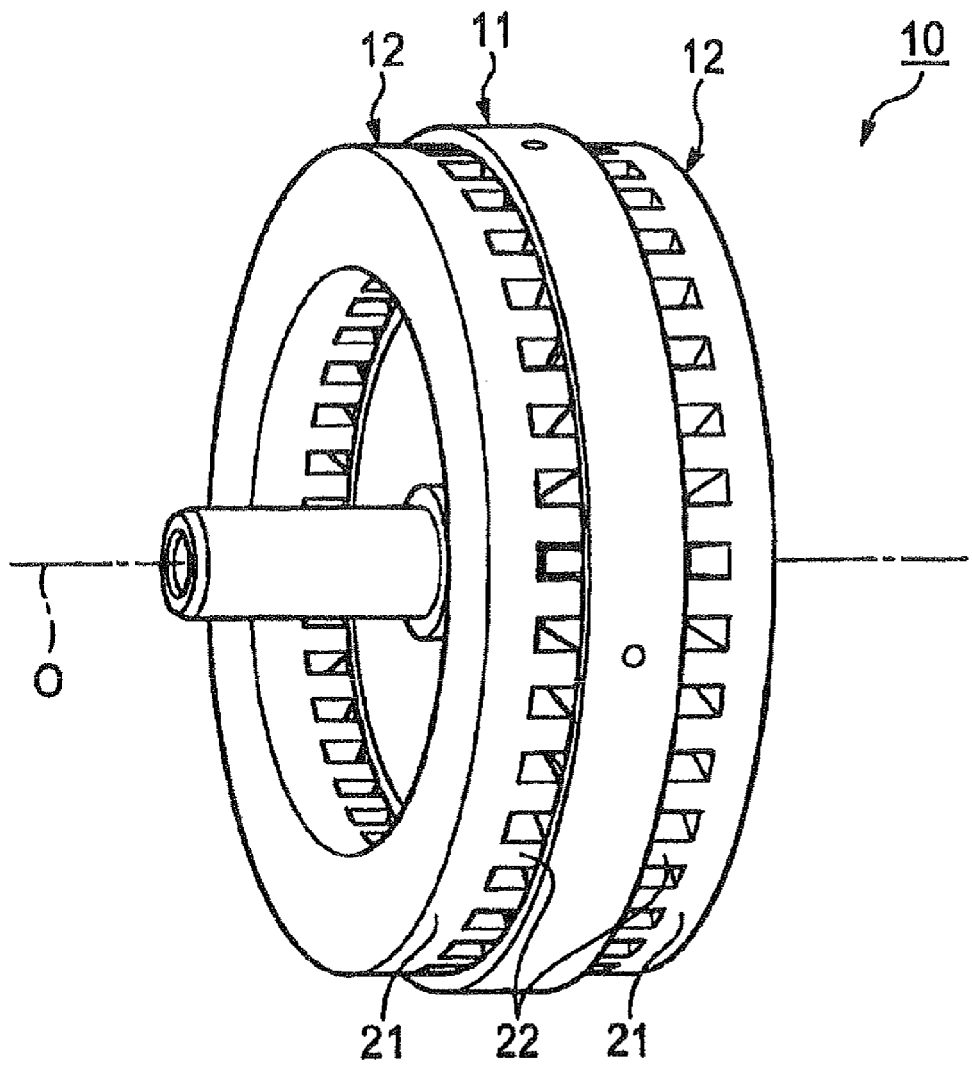
FIG. 1 is an overall perspective view of an axial gap motor according to a first embodiment of the invention.
Figure 2:
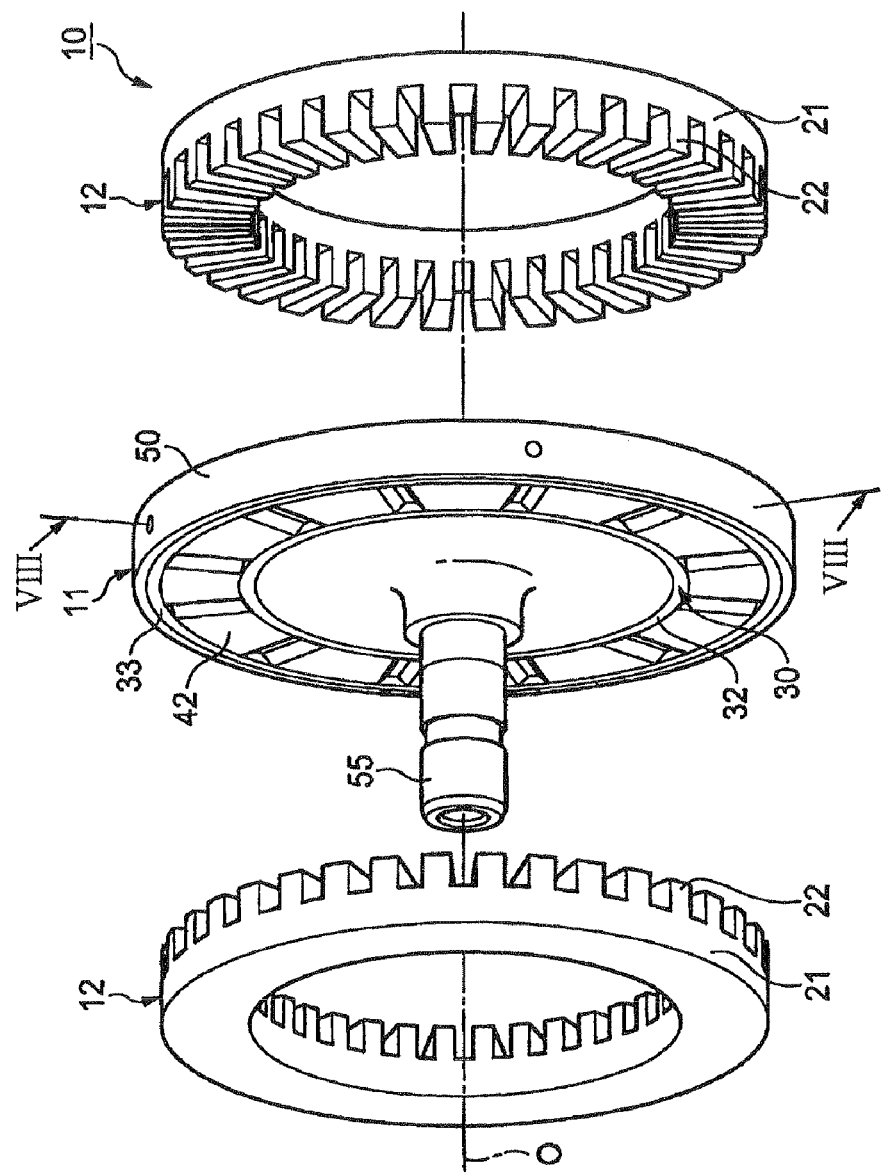
FIG. 2 is an exploded perspective view of the axial gap motor according to the first embodiment of the invention.

Hereinafter, embodiments of axial gap motors according to the invention will be described in detail by reference to the accompanying drawings. Note that the drawings are to be seen so that reference numerals given look oriented properly.

First Embodiment

An axial gap motor 10 according to a first embodiment of the invention includes, for example, as is shown in FIG. 1, a substantially annular rotor 11 which is provide rotatably about a rotational axis O of the axial gap motor 10 and a pair of stators 12 which are disposed to face each other so as to hold therebetween the rotor 11 from both sides thereof with respect to the direction of the rotational axis O and which each have stator windings of a plurality of phases which generate rotational fields for rotating the rotor 11.

This axial gap motor 10 is installed as a drive source in a hybrid vehicle or an electric vehicle, for example, and an output shaft thereof is connected to an input shaft of a transmission (not shown), so that driving power of the axial gap motor 10 is transmitted to drive wheels (not shown) of the vehicle via the transmission.

In addition, in the event that the drive force is transmitted to the axial gap motor 10 from the drive wheels when the vehicle is decelerated, the axial gap motor 10 functions as a generator so as to generate so-called regenerative braking force, and the dynamic energy of a vehicle body is recovered as electric energy (regenerative energy). Further, in a hybrid vehicle, for example, in the even that a rotational shaft of the axial gap motor 10 is connected to a crankshaft of an internal combustion engine (not shown), output of the internal combustion engine is transmitted to the axial gap motor. Then, as this occurs, the axial gap motor 10 also functions as the generator and generates dynamic energy.

Each stator 12 includes a substantially annular plate-shaped yoke portion 21, a plurality of tees 22, . . . , 22 which project towards the rotor 11 along the direction of the rotational axis O from positions on a confronting surface of the yoke portion 21 which confronts the rotor 11 which are positioned at predetermined intervals in a circumferential direction and stator windings (no shown) which are installed between the tees 22, 22 as required.

Each stator 12 is of a 6N-type, for example, in which there are six main poles (for example, U+, V+, W+, U−, V−, W−) and the stators 12 are set so that the U+, V+, W+ poles of the one stator 12 face the U−, V−, W− poles of the other stator 12 with respect to the direction of the rotational axis O. For example, relative to the pair of stators 12, 12 which face each other with respect to the direction of the rotational axis O, three tees, 22, 22, 22 of one of the stators 12 which face one of the U+, V+, W+ poles and the U−, V−, W− poles and three tees 22, 22, 22 of the other stator 12 which face the other of the U+, V+, W+ poles and the U−, V−, W− poles are set so as to face each other with respect to the direction of the rotational axis O, so that energization of the tees 22 of the stator 12 facing the other stator 12 with respect to the direction of the rotational axis O and energization of the tees 22 of the other stator 12 are set so as to be reverse in terms of electrical angle.

Figure 3:
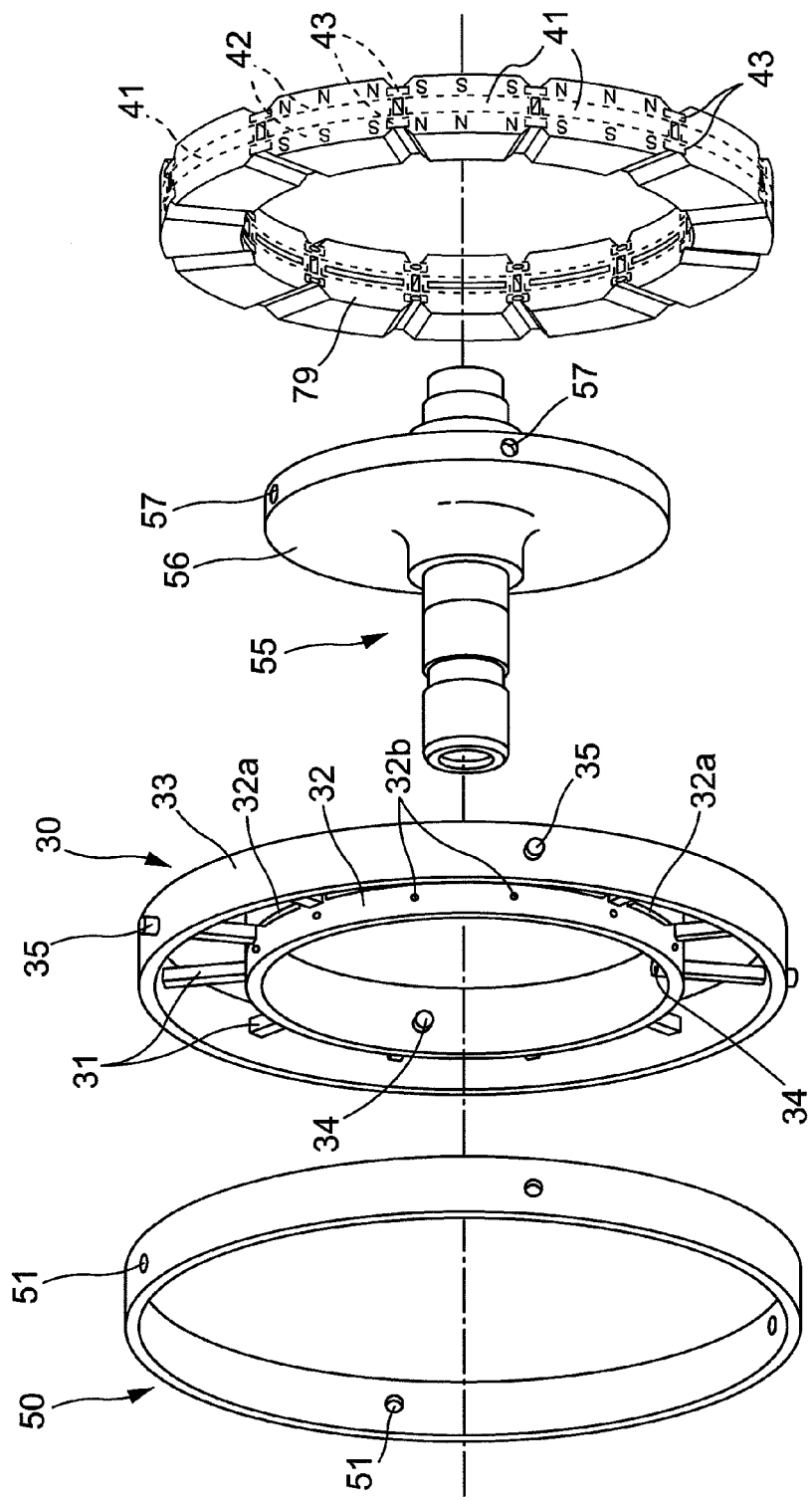
FIG. 3 is an exploded perspective view of a rotor in FIG. 2.
Figure 4:
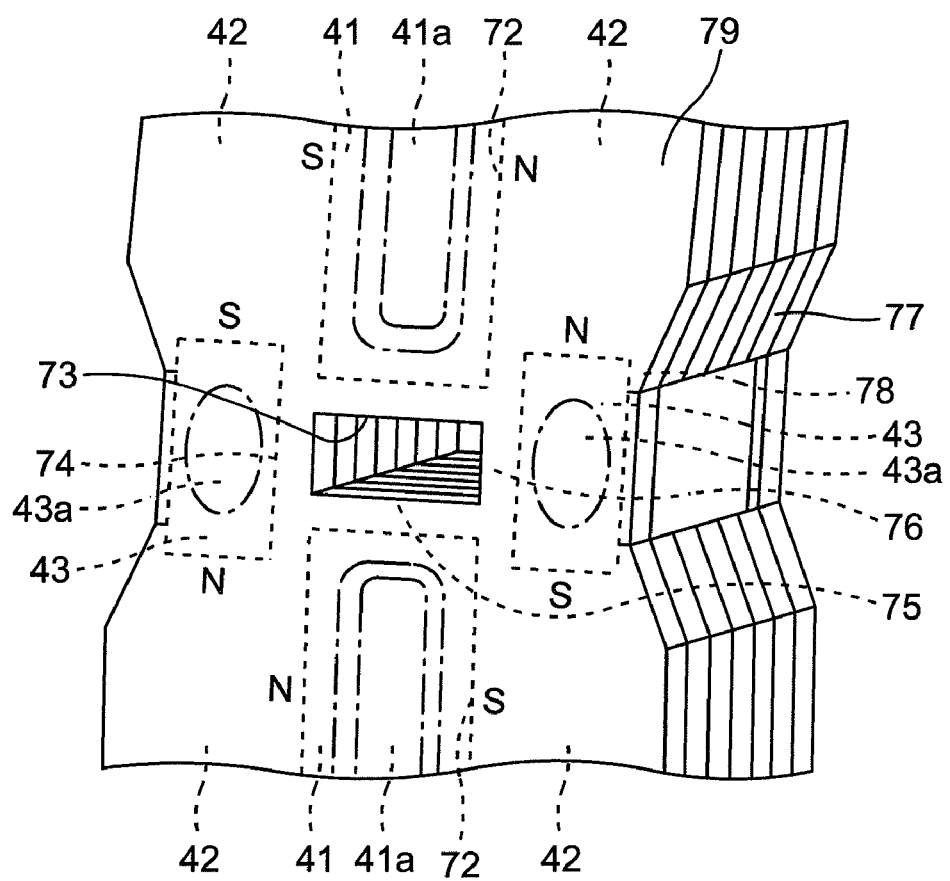
FIG. 4 is an enlarged perspective view of a main part showing a state in which main magnet portions and auxiliary magnet portions are inserted into a lamination member.

As is shown in FIGS. 3 and 4, the rotor 11 includes a shaft portion 55, a plurality of main magnet portions 41, . . . , 41, a plurality of auxiliary magnet portions 43, . . . , 43, a plurality of yoke portions 42, . . . , 42, a rotor frame 30 made of a non-magnetic material and an outer ring 50.

Figure 6:
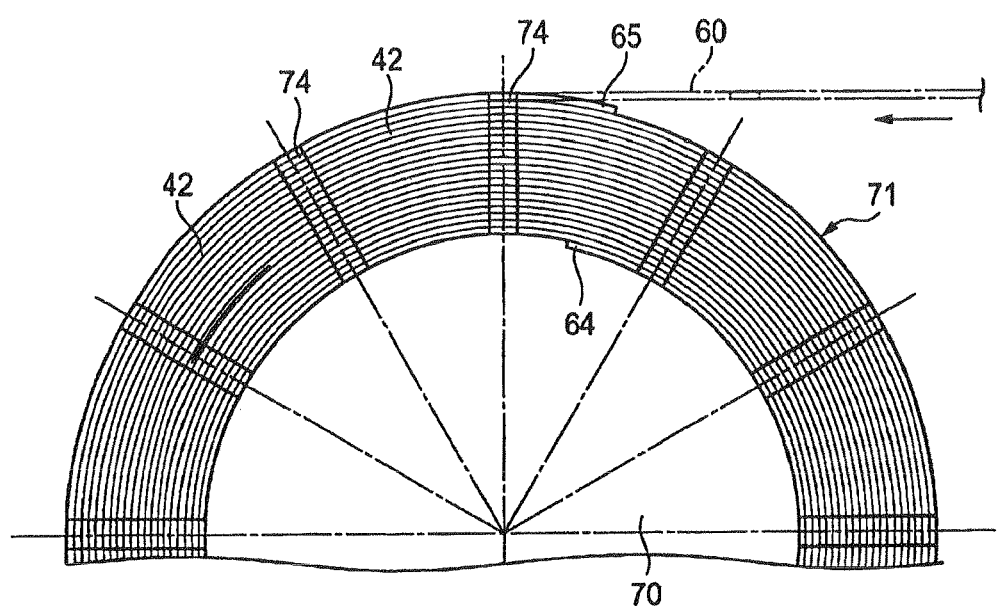
FIG. 6 is a drawing showing a state in which the tape-like sheet of electromagnetic sheet is wound into a lamination member.

As is shown in FIGS. 5A to 5C and 6, the plurality of yoke portions 42, . . . , 42 are made up of a lamination member 71 into which a tape-like sheet of electromagnetic steel 60 is wound. Rib cutouts 63 only are formed in an innermost layer and an outermost layer and main magnet portion cutouts 61, auxiliary magnet portion cutouts 62 and rib cutouts 63 are formed in intermediate layers sandwiched between the inner most layer and the outermost layer of the tape-like sheet of electromagnetic steel 60 through punching by use of a press molding machine. As is shown in FIG. 6, with a winding starting portion 64 temporarily fastened to a winding core 70, the tape-like sheet of electromagnetic steel 60 is wound round the winding core 70 and is cut at a winding completing portion 65 and is welded to a layer lying thereunderneath, whereby the tape-like sheet of electromagnetic steel 60 is wound into the lamination member 71.

In addition, the tape-like sheet of electromagnetic steel 60 is wound around the winding core 70, and hence, a longitudinal length thereof increases from a first layer lying on a radially innermost side to a second layer to a third layer and so forth. Because of this, in FIGS. 5A to 5C, assuming that a center-to-center distance between the circumferentially adjacent rib cutouts 63 is referred to as a pitch P, a pitch P in each layer is set to gradually increase towards radially outwards.

In the lamination member 71 into which the tape-like sheet of electromagnetic steel 60 is wound, at an intermediate portion with respect to the direction of the rotational axis, a plurality of substantially fan-shaped main magnet portion insertion holes 72, . . . , 72 which are formed by the main magnet portion cutouts 61 and a plurality of substantially rectangular parallelepiped rib accommodation holes 73, . . . , 73 which are formed by the rib cutouts 63 are provided alternately at predetermined intervals in the circumferential direction. In addition, at either side of the lamination member 71 with respect to the direction of the rotational axis, a plurality of substantially fan-shaped yoke portions 42, . . . , 42 and a plurality of substantially rectangular parallelepiped auxiliary magnet portion accommodation portions 74, . . . , 74 which are formed by the auxiliary magnet portion cutouts 62 so as to open axially outwards are provided alternately at predetermined intervals in the circumferential direction (refer to FIG. 4). The innermost layer of the electromagnetic steel sheet 60 makes up a casting alloy entry preventing plate 79 which is disposed between an inner cylindrical portion 32 of the rotor frame 30, which will be described later, and the plurality of main magnet portions 41, . . . , 41.

In addition, the plurality of yoke portions 42, . . . , 42 are disposed at either side of the plurality of main magnet portion insertion holes 72, . . . , 72 with respect to the direction of the rotational axis, and the plurality of auxiliary magnet portion accommodation portions 74, 74 are disposed at either side of the plurality of rib accommodation holes 73, . . . , 73 with respect to the direction of the rotational axis. The main magnet portion insertion hole 72 and the rib accommodation hole 73 are partitioned by an axial connecting portion 75 which connects together the yoke portions 42 lying at both the sides of the main magnet portion insertion hole 72. In addition, the auxiliary magnet portion accommodation portion 74 and the rib accommodation hole 73 are partitioned by a circumferential connecting portion 76 which connects together the yoke portions 42 which lie adjacent to each other in the circumferential direction.

The plurality of substantially fan-shaped main magnet portions 41, . . . , 41 each having substantially the same dimensions as those of each of the main magnet insertion holes 72, . . . , 72 in the lamination member 71 configured as described above are inserted individually into the main magnet insertion holes 72, . . . , 72. In addition, the plurality of substantially rectangular parallelepiped auxiliary magnet portions 43, . . . , 43 each having substantially the same dimensions of those of each of the auxiliary magnet portion accommodation portions 74, . . . , 74 are inserted individually into the auxiliary magnet portion accommodation portions 74, . . . , 74.

Note that in this embodiment, the electromagnetic steel sheet 60 is wound from the innermost layer to the intermediate layers of the lamination member 71, and then, the respective magnet portions 41, . . . , 41, 43, . . . , 43 are inserted thereinto, whereafter the electromagnetic steel sheet 60 is finally wound to lay the outermost layer.

In addition, as is shown in FIG. 4, the auxiliary magnet portion accommodation portion 74 positions the auxiliary magnet portion 43 with respect to the axial direction by the connecting portion 76 which connects together the yoke portions 42 which lie adjacent to each other in the circumferential direction and projecting portions 78 which are formed at distal end portions of sloping surfaces 77 formed at facing circumferential end portions of the yoke portions 42 lying adjacent to each other in the circumferential direction and with respect to the circumferential direction between facing circumferential lateral surfaces of the yoke portions 42 lying adjacent to each other in the circumferential direction.

By this configuration, the plurality of main magnet portions 41, . . . , 41 are disposed at predetermined intervals in the circumferential direction, and magnetizing directions thereof are directed towards the direction of the rotational axis so as to differ relative to each of the main magnet portions 41, 41 which lie adjacent to each other in the circumferential direction. In addition, the plurality of auxiliary magnet portions 43, . . . , 43 are disposed between the yoke portions 42 which lie adjacent to each other in the circumferential direction, and magnetizing directions thereof are directed towards the direction of the rotational axis and a direction which is at right angles to a radial direction. The magnetizing directions of the auxiliary magnet portions 43, 43 which lie adjacent to each other in the circumferential direction differ from each other, and the magnetizing directions of the auxiliary magnet portions 43, 43 which lie adjacent to each other in the direction of the rotational axis also differ from each other.

Further, the auxiliary magnet portions 43, 43 which hold the yoke portion 42 lying on one side of each main magnet portion 41 with respect to the direction of the rotational axis therebetween from both circumferential sides thereof are disposed so as to face each other at the same magnetic poles which are the same as a magnetic pole of the one side of the main magnet portion 41, while the auxiliary magnet portions 43, 43 which hold the yoke portion 42 lying on the other side of the main magnet portion 41 with respect to the direction of the rotational axis therebetween from both circumferential sides thereof are disposed so as to face each other at the same magnetic poles which are the same as a magnetic pole of the other side of the main magnet portion 41. By adopting this configuration, fluxes of the main magnet portion 41 and the auxiliary magnet portions 43, 43 converge by the flux lens effect realized by the so-called substantially Halbach arrangement of permanent magnets, whereby effective fluxes which are interlinked with the stators 12, 12 are increased relatively.

In addition, since the sloping surfaces 77 are formed at the circumferential end portions of each of the yoke portions 42, . . . , 42, the pole arc angle is adjusted, and a drastic change in magnetic resistance between the stators 12, 12 is suppressed, thereby making it possible to suppress the generation of torque ripple.

Figure 7A:
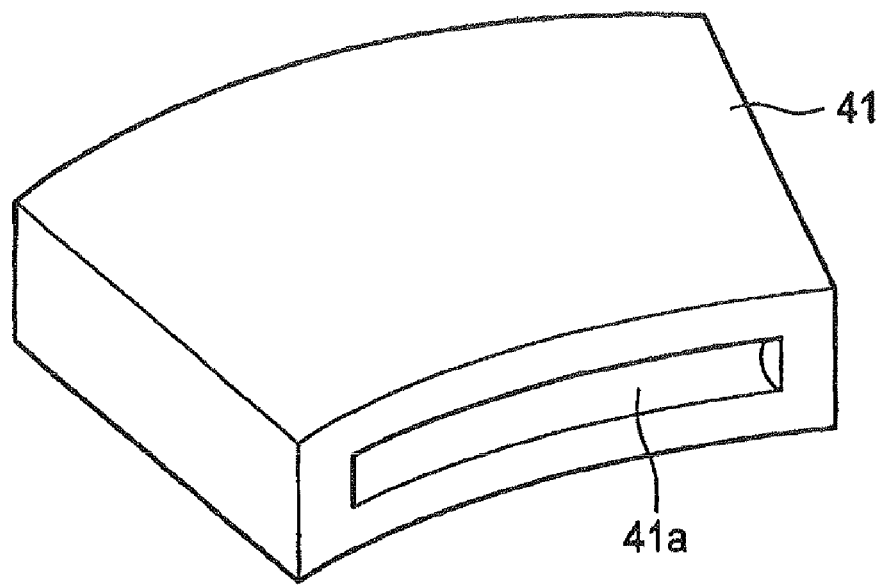
FIG. 7A is a perspective view of the main magnet portion.

As is shown in FIG. 7A, a groove 41a extending along a circumferential direction is formed at an intermediate portion with respect to the direction of the rotational axis on an inner circumferential surface of the main magnet portion 41 as a displacement preventing portion for preventing the displacement of the position of the main magnet portion 41. A circumferential length of this groove 41a is set shorter than a circumferential length of the inner circumferential surface of the main magnet portion 41.

Figure 7B:
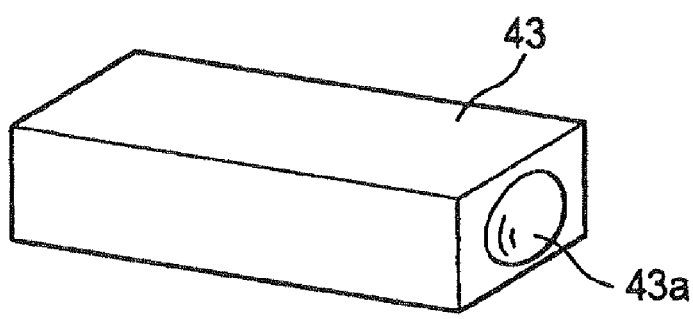
FIG. 7B is a perspective view of the auxiliary magnet portion.
Figure 8:
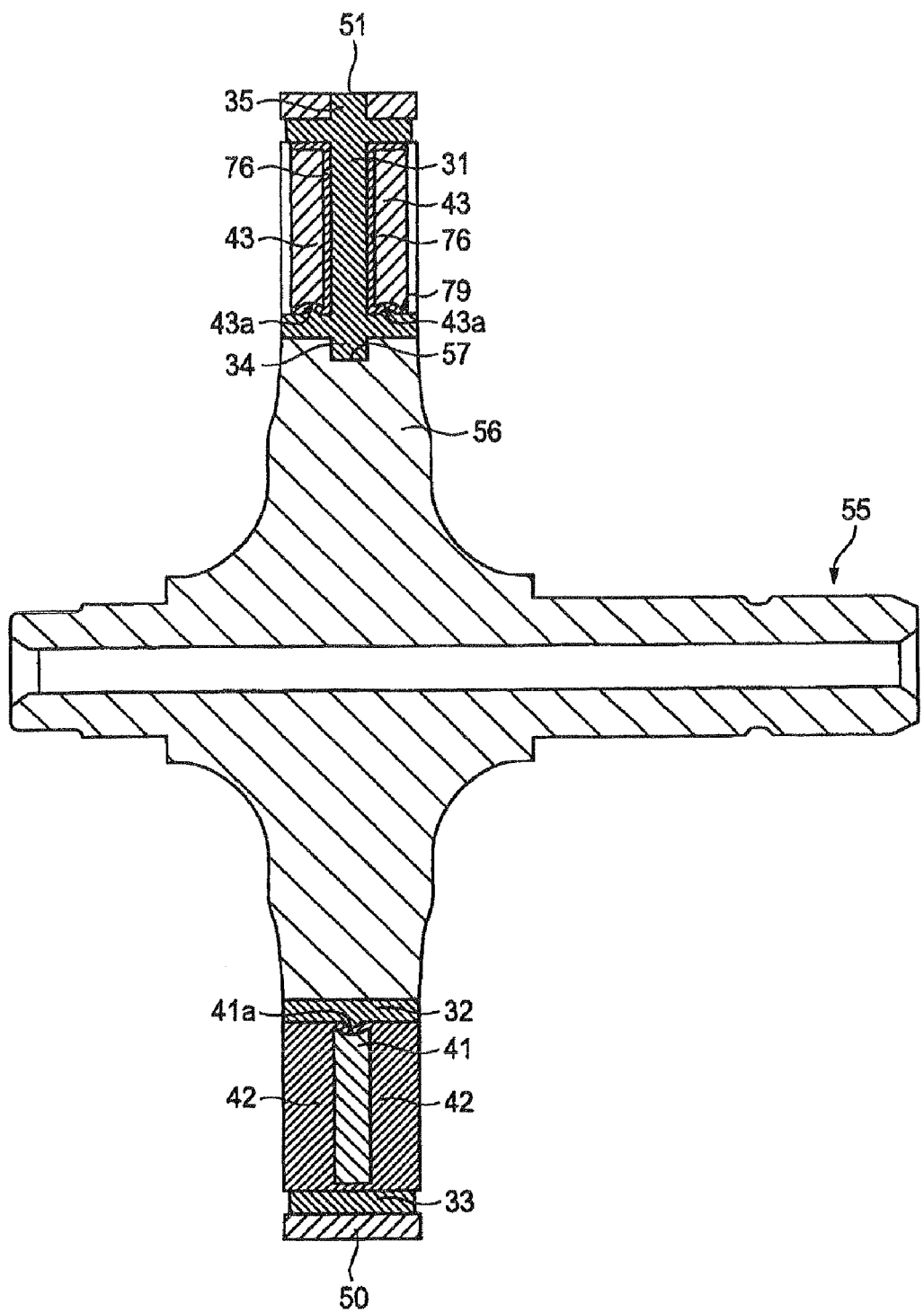
FIG. 8 is a sectional view of a rotor taken along the line VIII-VIII in FIG. 2.
Figure 9:
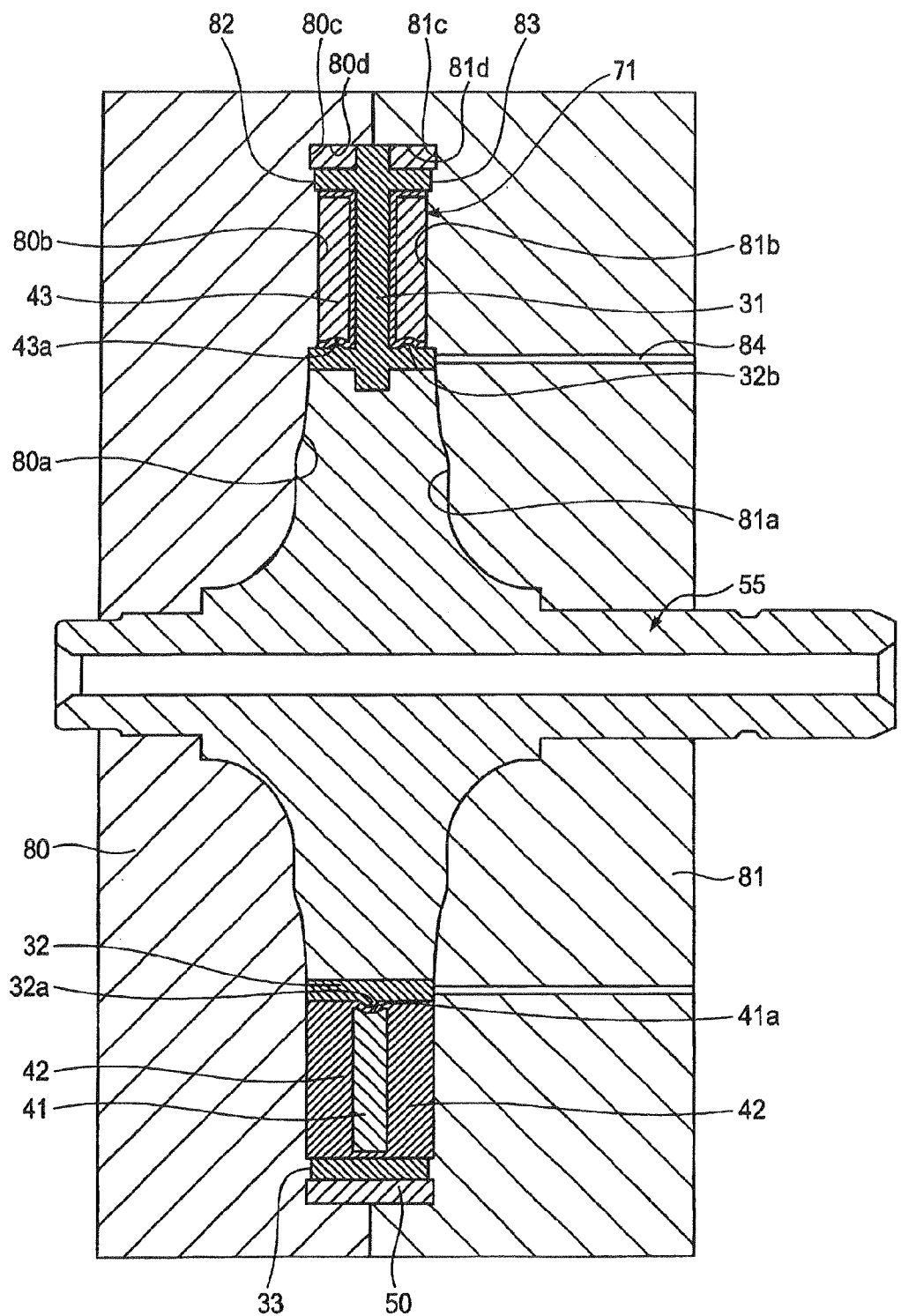
FIG. 9 is a sectional view showing a state in which a rotor is formed through casting.

In addition, as is shown in FIG. 7B, a groove 43a extending along a circumferential direction is also formed at an intermediate portion with respect to the direction of the rotational axis of an inner circumferential surface of the auxiliary magnet portion 43 as a different displacement preventing portion for preventing the displacement of the position of the auxiliary magnet portion 43.

The rotor frame 30 has a plurality of rib portions 31, . . . , 31 which extend in a radial direction individually within the rib accommodation holes 73, . . . , 73 in the lamination member 71 and which are disposed individually between the main magnet portions 41 which lie adjacent to each other in the circumferential direction and an inner cylindrical portion 32 and an outer cylindrical portion 33 which are provided, respectively, at inside diameter sides and outside diameter sides of the plurality of ribs 31, . . . , 31 and which are connected together by these ribs 31, . . . , 31.

A shaft portion 55 which is connected to an external drive shaft (for example, an input shaft of a transmission of a vehicle) is fixedly connected to an inner circumferential portion of the inner cylindrical portion 32 at a flange portion which is expanded diametrically towards the inner cylindrical portion 32 of the rotor frame 30. As is shown in FIG. 3, a plurality of rotor frame mounting hole portion 57 are formed in an outer circumferential surface of the flange portion 56, and a plurality of inwardly projecting portions 34 which are formed on the inner circumferential surface of the inner cylindrical portion 32 of the rotor frame 30 through casting enter those rotor frame mounting hole portions 57.

In addition, an annular outer ring 50, which is formed of a non-magnetic material such as a sheet of stainless steel, is integrally and fixedly connected to an outer circumferential portion of the outer cylindrical portion 33 so as to suppress a radially outward expansion of the yoke portions 42 which would otherwise occur by centrifugal force produced when the rotor 11 rotates at high speeds. A plurality of different rotor frame mounting hole portions 51 are formed in the outer ring 50 so as to penetrate therethrough in the radial direction, so that a plurality of outwardly projecting portions 35, which are formed on an outer circumferential surface of the outer cylindrical portion 33 of the rotor frame 30 through casting, enter the different rotor frame mounting hole portions 51. In addition, the inwardly projecting portions 34 and the outwardly projecting portions 35 are formed along the extending direction of the ribs 31 so as to improve the flow of die casting alloy when it is poured for casting.

Further, a plurality of projecting portions 32a, 32b are formed on an outer circumferential surface of the inner cylindrical portion 32 of the rotor frame 30 so as to enter the grooves 41a formed in the inner circumferential surfaces of the main magnet portions 41 and the grooves 43a formed in the inner circumferential surfaces of the auxiliary magnet portions 43 while deforming the casting alloy entry preventing plate 79 by a pressure produced when the die casting alloy is poured for casting.

The rotor frame 30 configured as described above is formed through casting by use of a non-magnetic die casting alloy such as aluminum alloy in such a state that the lamination member 71 in which the main magnet portions 41, . . . , 41 and the auxiliary magnet portions 43, . . . , 43 are inserted, the shaft portion 55 and the outer ring 50 are accommodated within a first and second molds 80, 81.

The first and second molds 80, 81 are divided into two in the direction of the rotational axis and have lateral surfaces 80a, 81a, 80b, 81b, 80c, 81c which correspond, respectively, to axial lateral surfaces of the shaft portion 55, axial lateral surfaces of the yoke portions 42 and the auxiliary magnet portions 43 and axial lateral surfaces of the outer ring 50. In addition, the first and second molds 80, 81 have inner circumferential surfaces 80d, 81d which correspond to an outer circumferential surface of the outer ring 50.

Step portions 82, 83 are provided on outside diameter sides of the lateral surfaces 80b, 81b of the molds 80, 81 which correspond to the axial lateral surfaces of the yoke portions 42 and the auxiliary magnet portions 43, so as to position the lamination member 71 in which the main magnet portions 41, ..., 41 and the auxiliary magnet portions 43, ..., 43 are inserted. In addition, the lamination member 71 is positioned with respect to the circumferential direction by use of the winding starting portion 64 and the winding completing portion 65 so as to improve the flow of die casting alloy into the rotor frame mounting portions 57 in the shaft portion 55 and the different rotor frame mounting hole portions 51 in the outer ring 50.

Then, the first and second molds 80, 81 are closed in such a state that the main magnet portions 41, ..., 41, the auxiliary magnet portions 43, ..., 43, the lamination member 71, the shaft portion 55 and the outer ring 50 are accommodated therein, and then, a die casting alloy is poured into a space defined between the molds 80, 81 from an annular gate 84 provided in the second mold 81. The gate 84 is provided so as to be opened to a radial position which corresponds to the inner cylindrical portion 32 of the outer frame 30. Because of this, the die casting alloy poured from the gate 84 enters a space for casting the inner cylindrical portion 32, passes through the rib accommodation holes 73 formed in the lamination member 71 and enters a space for casting the outer cylindrical portion 33. Further, the die casting alloy also flows into the rotor frame mounting hole portions 57 in the shaft portion 55 and the different rotor frame mounting hole portions 51 in the outer ring 50. By this action, the rotor frame 30 is formed through casting which has the ribs 31, the inner cylindrical portion 32, the outer cylindrical portion 33, the inwardly projecting portions 34 and the outwardly projecting portion 35.

In addition to this, since the casting alloy entry preventing plate 79 is pressed radially outwardly by a pressure produced by the die casting alloy which is poured for casting, the casting alloy entry preventing plate 79 is deformed so as to eliminate gaps defined between the casting alloy entry preventing plate 79 and the grooves 41a formed in the inner circumferential surfaces of the main magnet portions 41 and the grooves 43a formed in the inner circumferential surfaces of the auxiliary magnet portions 43. Because of this, the die casting alloy enters the grooves 41a in the main magnet portions 41 and the grooves 43a in the auxiliary magnet portions 43, whereby the plurality of projecting portions 32a, 32b which correspond, respectively, to the grooves 41a, 43a are formed on the outer circumferential surface of the inner cylindrical portion 32 of the rotor frame. As a result of this, the respective magnet portions 41, ..., 41, 43, ..., 43 are positioned with respect to the direction of the rotational axis and the circumferential direction by the plurality of projecting portions 32a, 32b and the casting alloy entry preventing plate 79, whereby the displacement or loosening of the respective magnet portions 41, ..., 41, 43, ..., 43 is prevented.

In addition, the die casting alloy is prevented from being brought into direct contact with the magnet portions 41, ..., 41, 43, ..., 43 by the casting alloy entry preventing plate 79, thereby making it possible to suppress the deterioration of coercive force of the magnet portions 41, ..., 41, 43, ..., 43.

Consequently, according to the axial gap motor 10 and the method for manufacturing the rotor thereof of this embodiment, the rotor 11 includes the plurality of main magnet portions 41, ..., 41 which are magnetized in the direction of the rotational axis and which are disposed at predetermined intervals in the circumferential direction, the plurality of yoke portions 42, ..., 42 which are disposed on either side of the plurality of main magnet portions 41, ..., 41 with respect to the direction of the rotational axis, the plurality of ribs 31, ..., 31 which are disposed individually between the main magnet portions 41, ..., 41 which lie adjacent to each other in the circumferential direction and the inner cylindrical portion 32 and the outer cylindrical portion 33 which are provided, respectively, at the inside diameter sides and the outside diameter sides of the plurality of ribs 31, ..., 31. Then, the main magnet portions 41, ..., 41 each have the groove 41a as the displacement preventing portion for preventing the displacement of the position of the main magnet portion 41 on the inner circumferential side thereof. By this configuration, the die casting alloy enters the grooves 41a n the main magnet portions 41, ..., 41 when the rotor frame 30 is formed through casting by use of the die casting alloy, whereby the displacement or loosening of the main magnet portions 41, ..., 41 can be prevented without fixing the main magnet portions 41, ..., 41 with an adhesive. By adopting this configuration, the generation of abnormal noise can be suppressed which would otherwise occur due to the generation of vibrations in the main magnet portions 41, ..., 41 by centrifugal force or inertial force produced when the rotor 11 rotates at high speeds.

In addition, since the casting alloy entry preventing plate 79 is disposed between the inner cylindrical portion 32 of the rotor frame 30 and the main magnet portions 41, ..., 41, the die casting alloy is prevented from being brought into contact with the lateral surfaces of the main magnet portions 41 by the casting alloy entry preventing plate 79, thereby making it possible to prevent the disruption of the flow of fluxes at the main magnet portions by the die casting alloy. In addition, also when performing casting, the deterioration of coercive force of the main magnet portions 41, ..., 41 can be suppressed.

In addition, since the groove 41a functioning as the position preventing portion extends along the circumferential direction at the intermediate portion with respect to the direction of the rotational axis on the inner circumferential surface of the main magnet portion 41, the displacement or loosening of the main magnet portion 41 at least in the direction of the rotational axis can be suppressed, thereby making it possible to suppress the generation of vibrations. Additionally, the casting alloy entry preventing plate 79 can easily be press attached to the main magnet portions 41, ..., 41 when performing casting.

Further, since the circumferential length of the groove 41a is shorter than the circumferential length of the inner circumferential surface of the main magnet portion 41, the displacement or loosening of the main magnet portion 41 can be suppressed not only in the direction of the rotational axis but also in the circumferential direction, thereby making it possible to suppress the generation of vibrations even when the rotating condition of the rotor 11 is changed (suddenly stopped, suddenly accelerated, reversely rotated).

In addition, the rotor 11 includes further the plurality of auxiliary magnet portions 43, ..., 43 which are magnetized in the direction of the rotational axis and the direction which is at right angles to the radial direction and which are disposed individually between the yoke portions 42, ..., 42 which lie adjacent to each other in the circumferential direction. The auxiliary magnet portions 43, ..., 43 each have the groove portion 43a as the different position preventing portion for preventing the displacement of the position of the auxiliary magnet portion 43 on the inner circumferential side thereof. Consequently, by adopting the substantially Halbach construction, the effective flux generation amount can be increased relatively by the flux lens effect which restricts the direction of fluxes of the main magnet portions 41, ..., 41. In addition, the displacement or loosening of the auxiliary magnet portions 43, ..., 43 can be prevented by the entry of the die casting alloy into the grooves 43a in the auxiliary magnet portions 43, ..., 43.

In addition, since the groove 43a functioning as the different displacement preventing portion extends along the circumferential direction at the intermediate portion with respect to the rotational axis of the inner circumferential surface of each of the auxiliary magnet portions 43, ..., 43, the displacement or loosening of the auxiliary magnet portions 43, ..., 43 can be prevented at least in the direction of the rotational axis, thereby making it possible to suppress the generation of vibrations. In addition, the casting alloy entry preventing plate 79 can easily be press attached to the auxiliary magnet portions 43, ..., 43.

Further, the rotor 11 includes further the outer ring 50 having the different rotor frame mounting hole portions 51 formed in the inner circumferential surface thereof, and the rotor frame 30 has the outwardly projecting portions 35 which enter the different rotor frame mounting hole portions 51 through casting. By adopting this configuration, the outer ring 50 is integrated with the rotor frame 30 when casting is performed, thereby making it possible to obviate the necessity of press fitting the outer ring 50 onto the rotor frame 30. In addition, the displacement of the positions of the yoke portions 42 and the main magnet portions 41 can be prevented which would otherwise occur when the rotor 11 rotates at high speeds, thereby making is possible to suppress the displacement or loosening of the yoke portions 42 and the main magnet portions 41.

In addition, by use of the lamination member 71 which is made to include the plurality of yoke portions 42 and the casting alloy entry preventing plate 79 which is disposed between the inner cylindrical portion 32 of the rotor frame 30 and the main magnet portions 41 as a result of winding the tape-like sheet of electromagnetic steel 60, the yoke portions 42 and the casting alloy entry preventing plate 79 can easily be made up, and the yoke portions and the rotor frame 30 can easily be integrated with each other.

Figure 10:
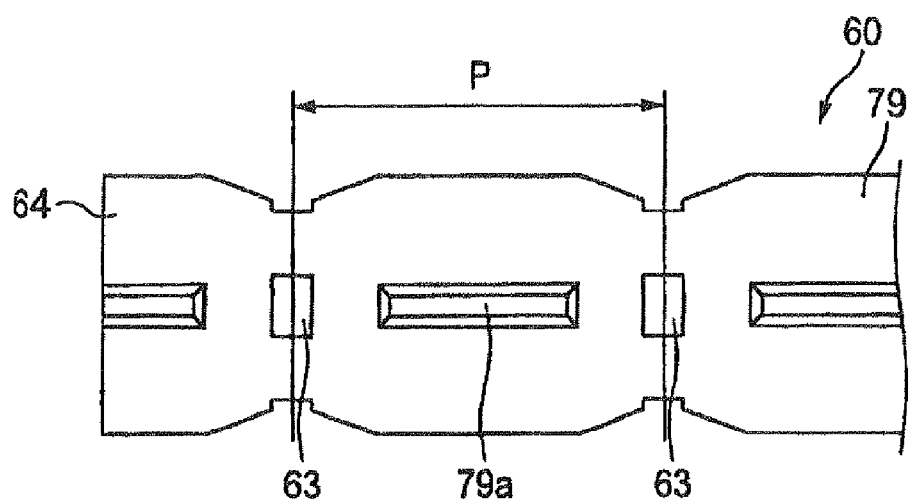
FIG. 10 is a plan view showing an innermost layer of a sheet of electromagnetic steel according to a modified example of the first embodiment.
Figure 11A:
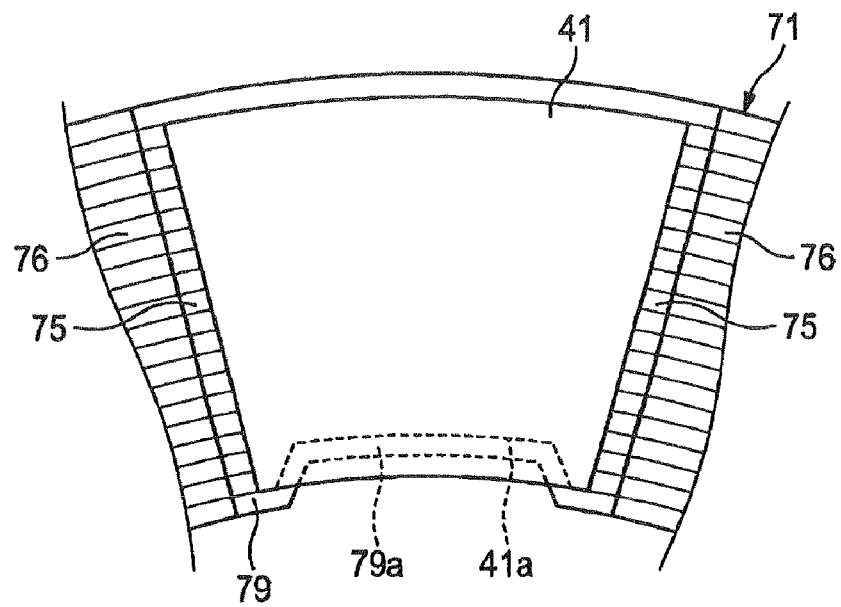
FIG. 11A is an enlarged sectional view of a main part showing a state in which a main magnet portion is inserted into a lamination member.
Figure 11B:
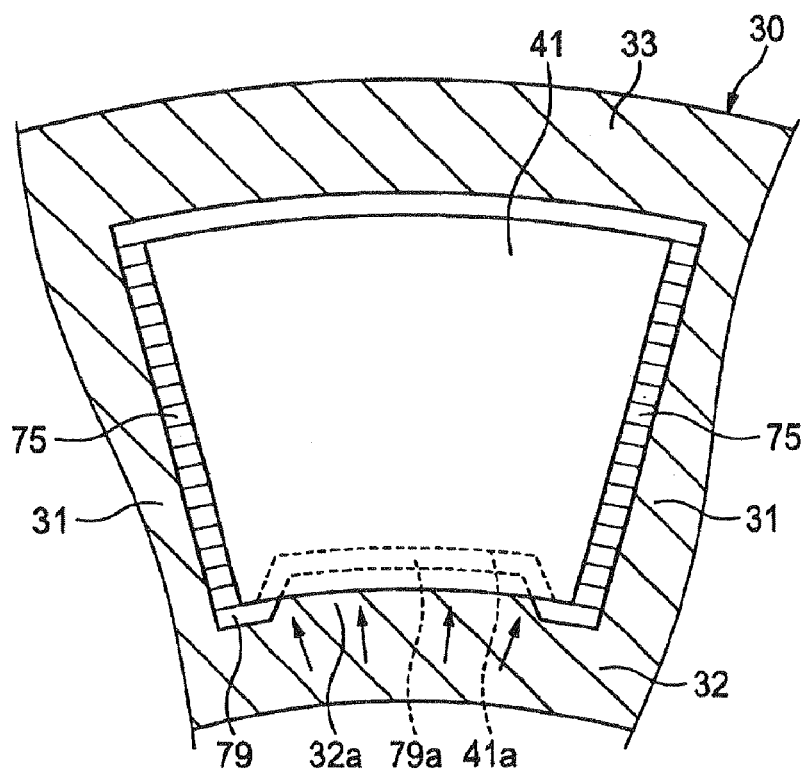
FIG. 11B is an enlarged sectional view of the main part showing a state in which a rotor frame is formed by pouring further a die casting alloy from the state shown in FIG. 11A.

As is shown in FIGS. 10, 11A and 11B, as a first modified example of this embodiment, preliminary deformed portions 79a, which are depressed or crimpled into a V-shape, may be formed in advance on the casting alloy entry preventing plate 79 which refers to the innermost layer of the electromagnetic steel sheet 60 in positions which correspond to the grooves 41a of the main magnet portions 41.

By adopting this configuration, as is shown in FIG. 11A, in such a state that the main magnet portions 41 are disposed within the lamination member 71, the preliminary deformed portions 79a fit in the corresponding grooves 41a. In addition, when the rotor frame 30 is formed through casting within the mold 80, as is shown in FIG. 11B, the die casting alloy presses against the preliminary deformed portions 79a of the casting alloy entry preventing plate 79 by a pressure produced by the die casting alloy which is poured into the mold 80 when casting is performed, and projecting portions 32a are formed on an outer circumferential surface of the inner cylindrical portion 32 of the rotor frame 30 so as to fit in the grooves 41a of the main magnet portions 41.

By forming the preliminary deformed portions 79a in the casting alloy entry preventing plate 79 in the way described above, even when the casting alloy entry preventing plate 79 is not deformed due to low pressure when casting is performed, the displacement or loosening of the main magnet portions 41 in the circumferential direction and the radial direction can be prevented by frictional force produced between the preliminary deformed portions 79a and the grooves 41a which are brought into contact with each other.

In addition, since the preliminary deformed portions 79a enter the grooves 41a, the displacement or loosening of the main magnet portions 41 in the direction of the rotational axis can also be prevented.

In addition, when a gap is present between the preliminary deformed portion 79a in the casting alloy entry preventing plate 79 and the groove 41a in the main magnet portion 41, the preliminary deformed portion 79a may be press attached to the groove 41a in the main magnet portion 41 by deforming the preliminary deformed portion 79a when casting is performed.

Figure 12:
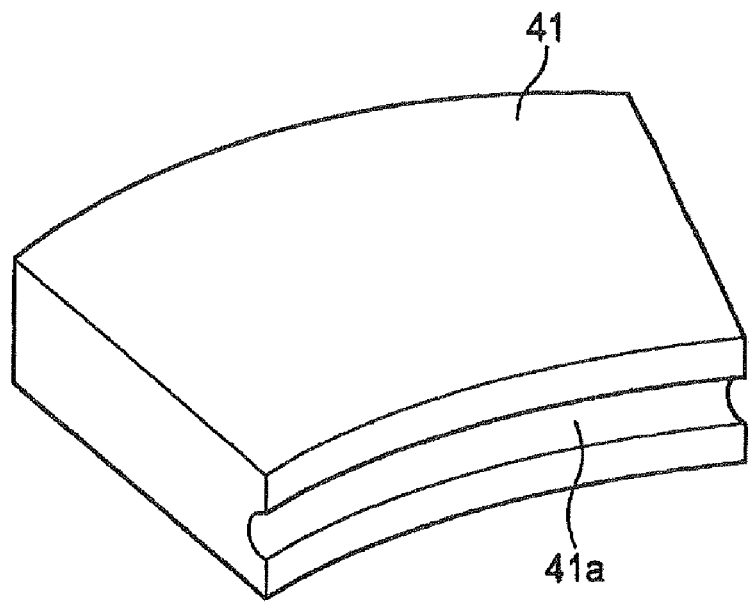
FIG. 12 is a perspective view of a main magnet portion according to another modified example of the first embodiment.

Additionally, as is shown in FIG. 12, as another modified example of this embodiment, the groove 41a may be formed so as to extend along a full circumferential length of the inner circumferential surface. In this case, too, the displacement or loosening of the main magnet portion 41 in the direction of the rotational axis can be prevented by the entry of the casting alloy entry plate 79 into the groove 41a as a result of being deformed.

Second Embodiment

Figure 13:
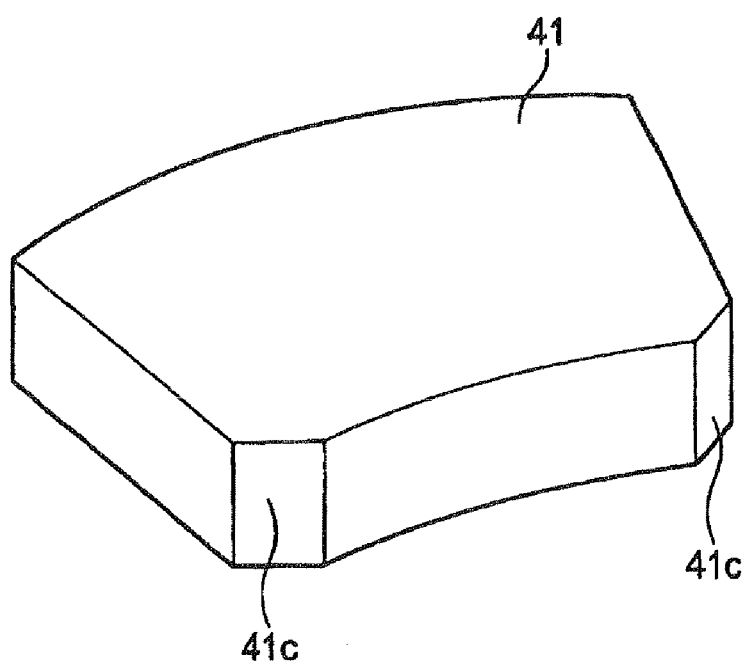
FIG. 13 is a perspective view of a main magnet portion of a rotor of an axial gap motor according to a second embodiment of the invention.

Hereinafter, a second embodiment of the invention will be described by reference to FIGS. 13 to 15. Note that like reference numerals will be given to like constituent portions to those of the first embodiment, and the description thereof will be omitted here.

A rotor 11 of this embodiment differs from that of the first embodiment in shapes of a main magnet portion 41 and a lamination member 71. Namely, as is shown in FIG. 13, the main magnet portion 41 has a pair of chamfered portions 41c which results by thread chamfering corners between an inner circumferential surface and both circumferential lateral surfaces of the main magnet portion 41.

Figure 14A:
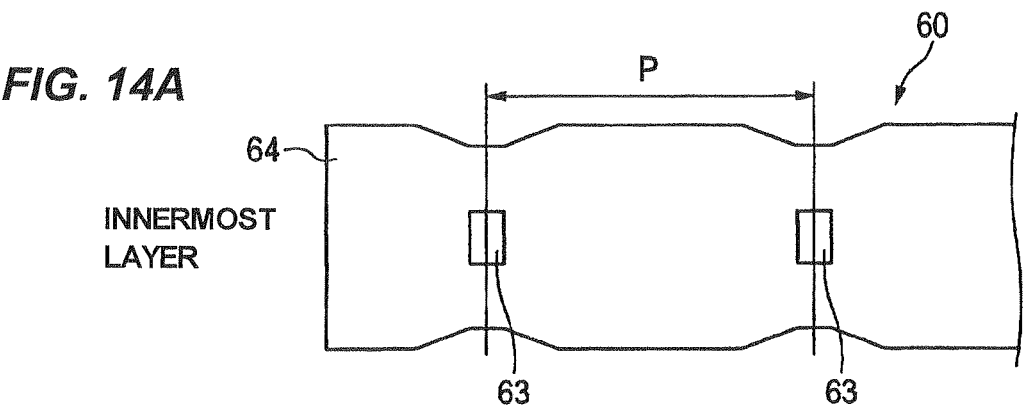
FIG. 14A is a plan view showing an innermost layer of a tape-like sheet of electromagnetic steel of the rotor shown in FIG. 13.
Figure 14B:
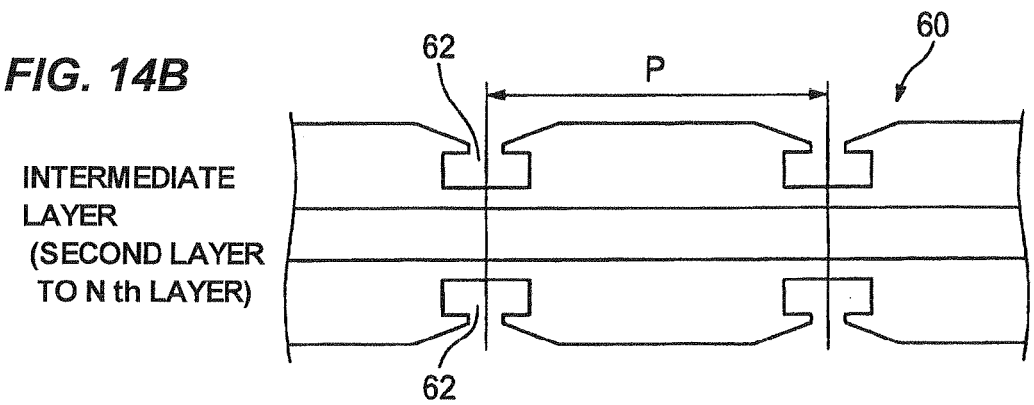
FIG. 14B is a plan view showing an intermediate layer (second layer to Nth layer) thereof.
Figure 14C:
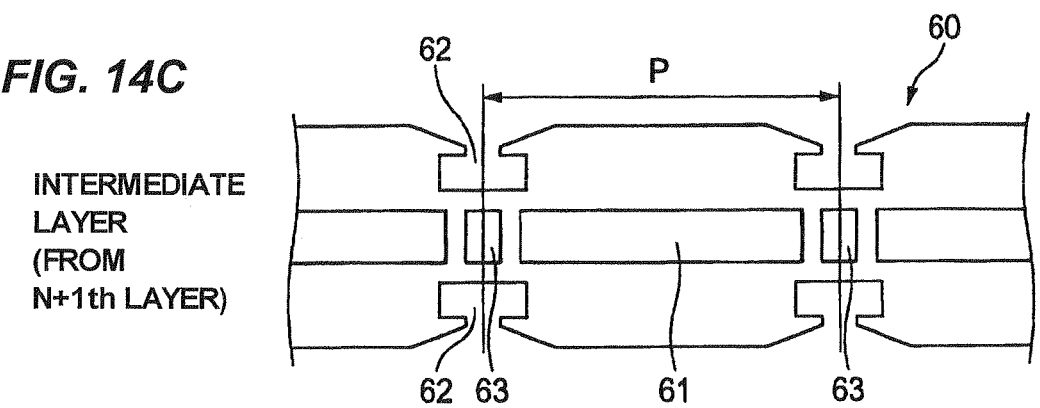
FIG. 14C is a plan view showing an intermediate layer (from N+1th layer) thereof.
Figure 14D:
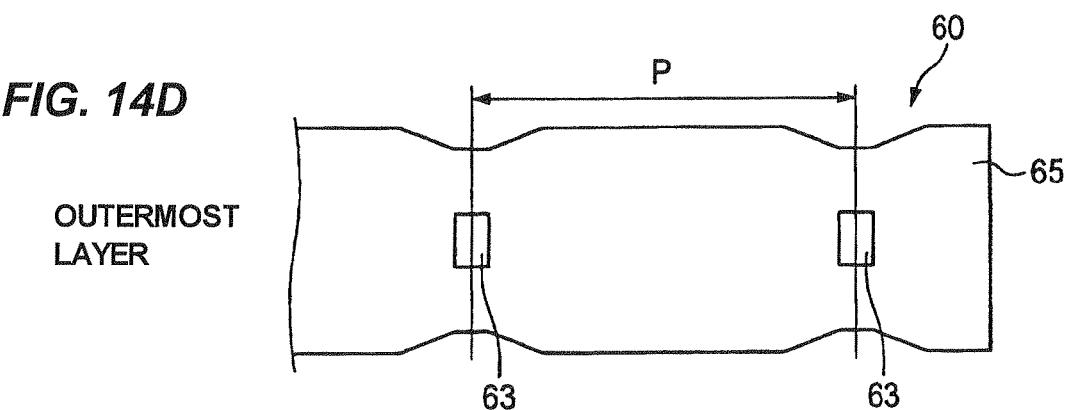
FIG. 14D is a plan view showing an outermost layer thereof.

In addition, as is shown in FIGS. 14A to 14D, in a tape-like sheet of electromagnetic steel 60 which makes up the lamination member 71, an innermost layer and layers from an N+1th intermediate layer to an outermost layer are punched out into the same configuration as that of the first embodiment, whereas intermediate portions with respect to the direction of the rotational axis of intermediate layers from a second layer to an Nth layer are cut out through a longitudinal direction of the electromagnetic steel sheet 60 (refer to FIG. 14B).

Figure 15A:
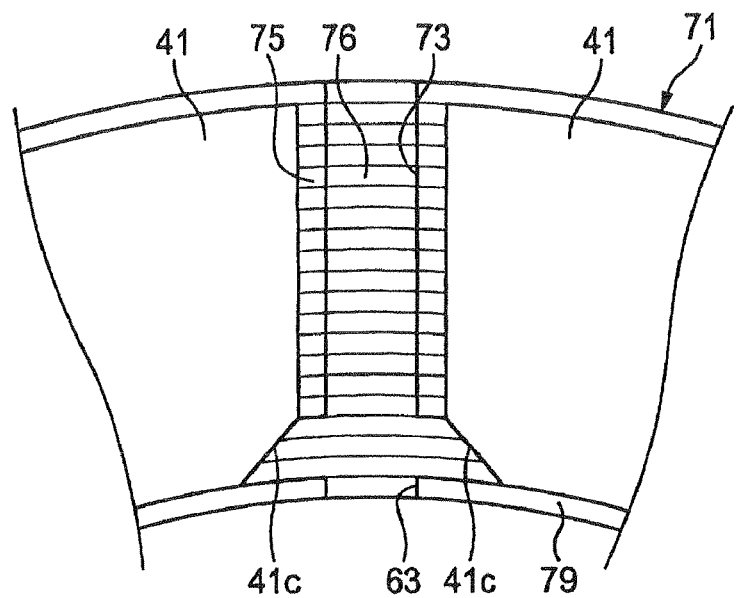
FIG. 15A is an enlarged sectional view of a main part showing a state in which the main magnet portions are inserted in a lamination member.
Figure 15B:
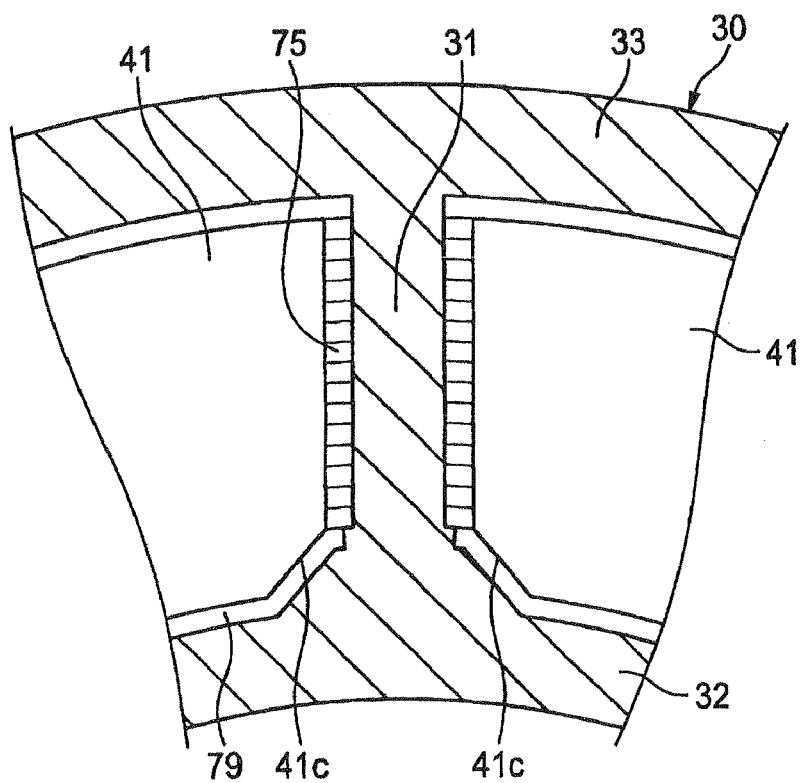
FIG. 15B is an enlarged sectional view of the main part showing a state in which a rotor frame is formed by pouring further a die casting alloy from the state shown in FIG. 15A.

By adopting this configuration, as is shown in FIG. 15A, in such a state that the main magnet portions 41 are disposed within the lamination member 71, no axial connecting portions 75 are formed in the intermediate layers from the second layer to the Nth layer which substantially correspond to a radial height of the chamfered portions 41c, and hence, peripheral portions of rib cutouts 63 of a casting alloy entry preventing plate 79 made up of the innermost layer becomes easy to be deformed. Then, when a rotor frame 30 is formed through casting within a mold 80, as is shown in FIG. 15B, a die casting alloy presses against the peripheral portions of the rib cutouts 63 of the casting alloy entry preventing plate 79 radially outwardly by a pressure produced when the die casting alloy is poured into the mold 80, whereby the peripheral portions are deformed so as to follow the chamfered portions 41c.

In this way, the main magnet portion 41 has the chamfered portions 41c between the inner circumferential surface and the circumferential lateral surfaces thereof, whereby the casting alloy entry preventing plate 79 is deformed so as to follow the chamfered portions 41c by the pressure produced by the die casting alloy which is poured into the mold 80. Because of this, the die casting alloy holds the main magnet portion 41 from both circumferential sides thereof, and therefore, the displacement or loosening of the main magnet portion 41 in the circumferential direction is prevented, whereby the generation of vibrations can be suppressed even when the rotating condition of the rotor is changed (suddenly stopped, suddenly accelerated, reversely rotated).

The other configurations and functions are similar to those of the first embodiment.

Figure 16:
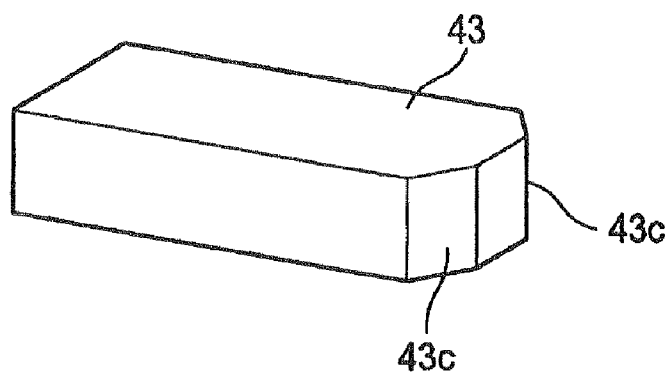
FIG. 16 is a perspective view of an auxiliary magnet portion according to a modified example of the second embodiment.
Figure 17:
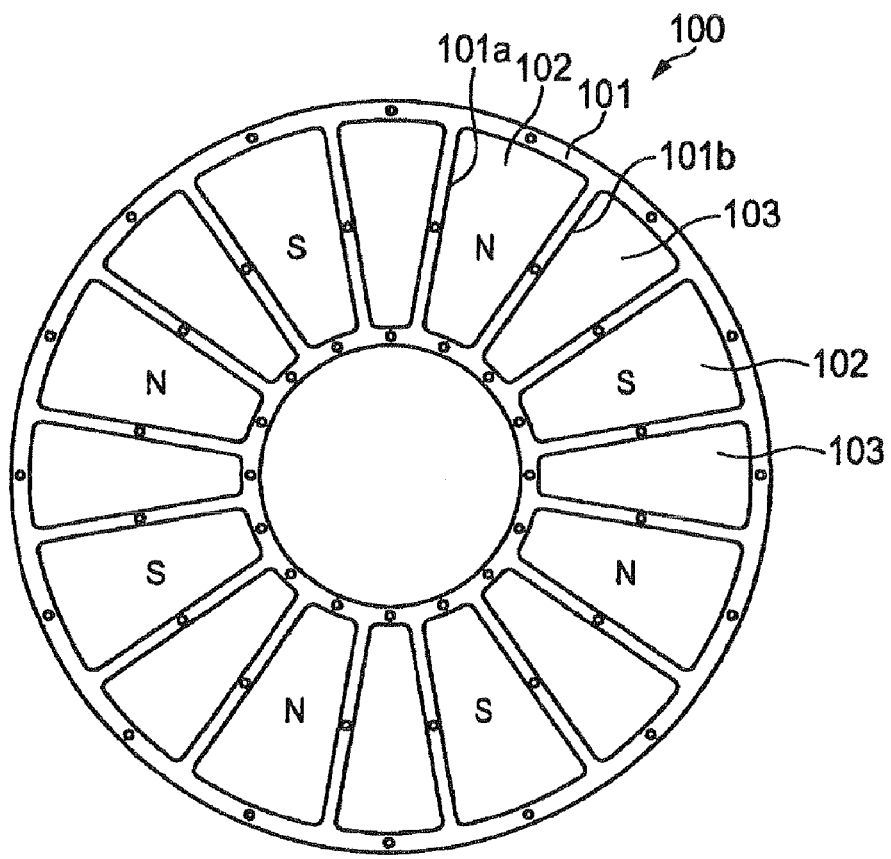
FIG. 17 is a front view showing a conventional rotor.

In this embodiment, while the chamfered portion 41c is described as functioning as the displacement preventing portion of the main magnet portion 41, as is shown in FIG. 16, a different displacement preventing portion may be configured by chamfered portions 43c which result by thread chamfering corners between an inner circumferential surface and circumferential lateral sides of the auxiliary magnet portion 43. In this case, too, since the die casting alloy holds the auxiliary magnet portion 43 from both circumferential sides thereof, a circumferential displacement or loosening of the auxiliary magnet portion 43 is prevented, whereby the generation of vibrations can be suppressed even when the rotating condition of the rotor is changed (suddenly stopped, suddenly accelerated, reversely rotated).

Note that the invention is not limited to the embodiments illustrated above but can be modified as required without departing from the spirit and scope of the invention.

In the embodiments above, the direct contact of the die casting alloy with the magnet portions 41, ..., 41, 43, ..., 43 is prevented by the innermost layer which is the casting alloy entry preventing plate 79 and the outermost layer. However, aluminum alloys can be used at temperatures which do not deteriorate the coercive force of the magnet portions 41, ..., 41, 43, ..., 43, and therefore, the innermost layer and the outermost layer may not be provided on the lamination member 71. As this occurs, a plurality of projecting portions 32a, 32b are formed as a result of the die casting alloy entering directly the grooves 41a, 43a of the magnet portions 41, ..., 41, 43, ..., 43, thereby making it possible to prevent the displacement or loosening of the magnet portions 41, ..., 41, 43, ..., 43.

In addition, in the embodiments, while the yoke portions 42, ..., 42 are formed by the lamination member 71 formed by winding the tape-like sheet of electromagnetic steel 60, yoke portions may be formed individually by green compacts. As this occurs, a casting alloy entry preventing plate 79 which is disposed between the inner cylindrical portion 32 of the rotor frame 30 and the main magnet portions 41 are formed separately from the yoke portions 42 formed in the way described above.

Further, in the embodiment, while the plurality of ribs 31, ..., 31, the inner cylindrical portion 32 and the outer cylindrical portion 33 of the rotor frame 30 are formed through casting by use of the die casting alloy, in this invention, at least the inner cylindrical portion 32 may only have to be formed of the die casting alloy. When only the inner cylindrical portion 32 is formed of the die casting alloy, no rib cutout 63 has to be provided in the casting alloy entry preventing plate 79, and hence, a plurality of ribs 31, ..., 31 which are formed separately may only have to be assembled to the rotor frame 30 after the yoke portions 42, ..., 42 and the magnet portions 41, ..., 41, 43, ..., 43 are integrated with the inner cylindrical portion 32 through casting.

In addition, in the embodiments, a configuration may be adopted in which a stator 12 is provided only either side of the rotor with respect to the direction of the rotational axis and a back yoke is disposed on the other side which faces no stator 12.

DESCRIPTION OF REFERENCE NUMERALS AND CHARACTER

10 Axial gap motor; 11 Rotor; 12 Stator; 30 Rotor frame; 31 Rib; 32 Inner cylindrical portion; 32a, 32b Projecting portion; 41 Main magnet portion; 41a Groove (Displacement preventing portion); 41c chamfered portion (Displacement preventing portion); 42 Yoke portion; 43 Auxiliary magnet portion; 43a groove (Different displacement preventing portion); 43c Chamfered portion (Different displacement preventing portion); 50 Outer ring; 51 Different rotor frame mounting hole portion; 55 Shaft portion; 57 Rotor frame mounting portion; 71 Lamination member; 72 Main magnet portion insertion hole; 73 Rib accommodation hole; 74 Auxiliary magnet portion accommodation portion; 79 Casting alloy entry preventing plate; 80 First mold; 81 Second mold; O rotational axis.

The invention claimed is:

1. An axial gap motor comprising: a rotor configured to rotate about a rotational axis; and a stator disposed to face the rotor from at least one side thereof with respect to the direction of a rotational axis, wherein:
the rotor comprises:
a plurality of main magnet portions magnetized in the direction of the rotational axis and disposed at predetermined intervals in a circumferential direction;
a plurality of yoke portions disposed on at least one side of the plurality of main magnet portions with respect to the direction of the rotational axis;
a rotor frame having a plurality of ribs disposed individually between the main magnet portions lying adjacent to each other in the circumferential direction and extending in a radial direction, and an inner cylindrical portion and an outer cylindrical portion provided at inside diameter sides and outside diameter sides, respectively, of the plurality of ribs, with at least the inner cylindrical portion made of a die casting alloy; and
a casting alloy entry preventing plate disposed between the inner cylindrical portion of the rotor frame and the main magnet portions;
the main magnet portions each have a displacement preventing portion at an inner circumferential side thereof for preventing the displacement of the position of the main magnet portion.

2. The axial gap motor according to claim 1, wherein the displacement preventing portion is a groove in an intermediate portion with respect to the direction of the rotational axis of an inner circumferential surface of the main magnet portion extending in a circumferential direction.

3. The axial gap motor according to claim 2, wherein a circumferential length of the groove is shorter than a circumferential length of the inner circumferential surface of the main magnet portion.

4. The axial gap motor according to claim 1, wherein the displacement preventing portion of the main magnet portion is made up of chamfered portions formed by thread chamfering corners of the main magnet portion between the inner circumferential surface and both circumferential lateral surfaces thereof.

5. The axial gap motor according to claim 1, wherein:
the rotor further comprises a plurality of auxiliary magnet portions lying individually between the yoke portions adjacent to each other in the circumferential direction, the auxiliary magnet portions being magnetized in a direction orthogonal to the direction of the rotational axis and a radial direction; and the auxiliary magnet portions each have a different displacement preventing portion provided at an inner circumferential side thereof for preventing the displacement of the position of the auxiliary magnet portion.

6. The axial gap motor according to claim 5, wherein the different displacement preventing portion of the auxiliary magnet portion is a groove in an intermediate portion with respect to the direction of the rotational axis of an inner circumferential surface of the auxiliary magnet portion extending along a circumferential direction.

7. The axial gap motor according to claim 5, wherein the different displacement preventing portion of the auxiliary magnet portion is made up of chamfered portions formed by thread chamfering corners of the auxiliary magnet portion between the inner circumferential surface and both circumferential lateral surfaces thereof.

8. The axial gap motor according to claim 1, wherein:
the rotor further comprises an outer ring having different rotor frame mounting hole portions formed in an inner circumferential surface thereof; and
the rotor frame has outwardly projecting portions formed through casting thereon so as to enter the different rotor frame mounting hole portions in the outer ring.

9. A manufacturing method for manufacturing a rotor of an axial gap motor comprising a rotor rotatably about a rotational axis, and a stator disposed to face the rotor from at least one side thereof with respect to the direction of a rotational axis, the rotor comprising a plurality of main magnet portions magnetized in the direction of the rotational axis and disposed at predetermined intervals in a circumferential direction, a plurality of yoke portions disposed on at least one side of the plurality of main magnet portions with respect to the rotational axis, and a rotor frame having a plurality of rib disposed individually between the main magnet portions lying adjacent to each other in the circumferential direction and extending in a radial direction, and an inner cylindrical portion and an outer cylindrical portion provided at inside diameter sides and outside diameter sides, respectively, of the plurality of ribs, comprising the steps of:
at least positioning the plurality of main magnet portions having displacement preventing portions at the inner circumferential sides thereof for preventing the displacement of the positions of the main magnet portions and the plurality of yoke portions in molds;
disposing a casting alloy entry preventing plate between the inner cylindrical portion of the rotor frame and the main magnet portions; and
at least pouring a die casting alloy into the molds to cast it into the inner cylindrical portion of the rotor frame while causing the die casting alloy to enter the displacement preventing portions.

10. The manufacturing method for manufacturing a rotor of an axial gap motor according to claim 9, wherein:
in the casting step, the casting alloy entry preventing plate is deformed according to the shape of the displacement preventing portions.

11. The manufacturing method for manufacturing a rotor of an axial gap motor according to claim 9, wherein
a casting alloy entry preventing plate having preliminarily deformed portions adapted to be accommodated in advance in the displacement preventing portions of the main magnet portions is disposed between the inner cylindrical portion of the rotor frame and the main magnet portions.

12. The manufacturing method for manufacturing a rotor of am axial gap motor according to claim 9, further comprising the step of:
forming a lamination member making up the plurality of yoke portions and the casting alloy entry preventing plate disposed between the inner cylindrical portion of the rotor frame and the main magnet portions by winding a tape-like sheet of electromagnetic steel.

13. The manufacturing method for manufacturing a rotor of an axial gap motor according to claim 9, wherein:
the rotor comprises further a plurality of auxiliary magnet portions lying individually between the yoke portions adjacent to each other in the circumferential direction, the auxiliary magnet portions being magnetized in a direction orthogonal to the direction of the rotational axis and a radial direction;
in the positioning step, the plurality of auxiliary magnet portions each having a different displacement preventing portion at an inner circumferential side thereof for preventing the displacement of the position of the auxiliary magnet portion are positioned in the molds; and
in the casting step, the die casting alloy also enters further the different displacement preventing portions.

14. The manufacturing method for manufacturing a rotor of an axial gap motor according to claim 13, wherein
a casting alloy entry preventing plate having different preliminary deformed portions configured to be accommodated in advance in the different displacement preventing portions of the auxiliary magnet portions is disposed between the inner cylindrical portion of the rotor frame and the auxiliary magnet portions.

* * * * *